United States Patent [19]

Dannenberg et al.

[11] 4,196,013
[45] Apr. 1, 1980

[54] OXIDATION RESISTANT ASPHALT COMPOSITIONS

[75] Inventors: Eli M. Dannenberg, Mashpee; Frank R. Williams, Quincy, both of Mass.

[73] Assignee: Cabot Corporation, Boston, Mass.

[21] Appl. No.: 953,848

[22] Filed: Oct. 23, 1978

[51] Int. Cl.² .................. C08L 95/00; C09D 3/24
[52] U.S. Cl. .................. 106/281 R; 106/273 R; 404/17; 404/32
[58] Field of Search .................. 106/281 R, 273, 316; 404/17, 32, 71

[56] References Cited

U.S. PATENT DOCUMENTS

| | | | |
|---|---|---|---|
| 727,507 | 5/1903 | Warren | 106/281 R |
| 2,323,461 | 7/1943 | Donelson | 106/281 |
| 3,123,487 | 3/1964 | Verdier | 106/281 R |
| 3,707,388 | 12/1972 | Kinnaird, Jr. | 106/281 |
| 4,069,181 | 1/1978 | Healy et al. | 260/28.5 AB |
| 4,094,697 | 6/1978 | Rostler | 106/280 |

*Primary Examiner*—Theodore E. Pertilla

[57] ABSTRACT

Disclosed herein are carbon black-containing asphalt compositions having improved properties of resistance to thermal and actinic oxidation.

5 Claims, No Drawings

4,196,013

OXIDATION RESISTANT ASPHALT COMPOSITIONS

BACKGROUND OF THE INVENTION

This invention relates generally to asphalt compositions and is more particularly concerned with asphalt compositions having improved actinic and thermal oxidation properties.

Petroleum based asphalts are products of commerce which find extensive usage in a number of widely divergent applications. For instance, petroleum asphalts are extensively used as a primary ingredient in anti-rust coating compositions for metallic structures such as fuel storage tanks. Many roofing materials such as roofing tars, mastics, cements, impregnated felts and shingles are based upon petroleum asphalts as major components thereof. Petroleum derived asphalts are also utilized as asphalt cements in the preparation of bituminous concretes for paving applications.

The above and other applications of petroleum based asphalts are predicated, in large measure, upon the generally good weathering characteristics thereof. Nevertheless, preparation of compositions and materials containing petroleum asphalts often requires heating of the asphalt to relatively high temperatures of about 300° F. or above, which heating often results in at least some degradation of the asphalt due to thermal oxidation thereof. Too, since the end uses to which such asphalts are put often involve extensive outdoor exposure, degradation of the asphalt also often occurs due to actinic ray oxidation.

In U.S. Pat. No. 4,069,181 Jan. 17, 1978, to Healy et al., there is disclosed a composition and method by which asphalt cements are "rubberized" by dispersion therein of an EPDM or EPM elastomer. In carrying out the Healy et al. invention, the elastomeric component is first premixed with a reinforcing grade of carbon black, thereby to produce a rubber masterbatch. Sufficient carbon black is employed in the preparation of the rubber masterbatch as to balance the specific gravity thereof with that of the asphalt. The masterbatch is then dispersed into the asphalt, the specific gravity balance achieved by the presence of the carbon black in the masterbatch serving to prevent subsequent separation of the EPDM or EPM from the asphalt.

In U.S. Pat. No. 4,094,697, June 13, 1978, to F. S. Rostler, there are disclosed asphalt cement and concrete compositions having improved abrasion properties, which compositions contain relatively high concentrations of reinforcing carbon black fillers dispersed therein. Preparation of the asphalt cement and concrete compositions is disclosed to be achieved by providing the reinforcing carbon black filler in the form of a pelleted mixture thereof with an oil, the oil being a solvent for the asphalt. The reinforcing carbon black/oil mixture is dispersed into the asphalt cement in such quantity as to result in an ultimate carbon black loading therein of at least 10% by weight of the asphalt cement. At certain carbon black to oil weight ratios the stiffening effect of the carbon black is offset by the solvating effect of the oil to the extent that the asphalt cement composition prepared in accordance with the invention has a penetration value which is the same as or only slightly different from that of the starting material asphalt cement.

In accordance with the present invention, it has been discovered that when an oil furnace carbon black is dispersed into a petroleum based asphalt at a concentration substantially below that at which substantial physical reinforcement of the asphalt occurs, there results substantial improvement in the thermal and actinic oxidation resistance of the asphalt.

OBJECTS OF THE INVENTION

It is a principal object of the invention to provide novel petroleum based asphalt compositions.

It is another object of the invention to provide petroleum based asphalt compositions having improved resistance to thermal oxidation.

It is yet another object of the invention to provide petroleum based asphalt compositions having improved resistance to actinic oxidation.

It is still another object of the invention to provide petroleum based asphalt compositions having improved service lives in various of the end-item applications to which they are put.

Other objects and advantages of the present invention will in part be obvious and will in part appear hereinafter.

SUMMARY OF THE INVENTION

The improved asphalt compositions of the invention comprise a petroleum asphalt having dispersed therein and in direct contact therewith an oil furnace carbon black in an amount effective to substantially improve the resistance of said asphalt to thermal or actinic oxidation but below an amount at which substantial physical reinforcement of said asphalt by said carbon black occurs.

DESCRIPTION OF PREFERRED EMBODIMENTS

By "petroleum asphalt" is meant any asphalt whose genesis lies in the fractionation or treatment of crude oils and their fractions. Typical of such asphalts are the straight-run asphalts which arise from atmospheric, steam and/or vacuum distillation of crude oils or those which arise as a result of solvent precipitation treatments of raw lubricating oils and their fractions. Also included are the thermal or "cracked" asphalts which are separated as cracker bottom residues from refinery cracking operations and the asphalts produced as by-products in hydrorefining operations in which heavy petroleum residues are up-graded into light hydrocarbons by treatment with hydrogen. "Blown" asphalts are also included within the ambit of the invention. Such asphalts are generally produced by heating a straight-run asphalt to temperatures of between about 450° F. and 550° F. and blowing air into the molten asphalt under controlled conditions and for periods of time sufficient to yield a product asphalt having an increased softening point. This blowing process is generally employed to alter the rheological properties of the starting material asphalt and is sometimes referred to as an oxidizing treatment. However, as will be recognized, these blown asphalt products possess the properties desired by the end-item user thereof and are desirably protected from further oxidation and corresponding changes of properties during the preparation and use of end-item compositions prepared therefrom. Blown asphalts are generally considered to have particular utility in asphaltic roofing compositions wherein their generally improved resistance to slumping and flow over relatively wide ranges of loading times and temperatures generally better befit them for such applications.

Substantially any oil furnace carbon black is suitable for use in the preparation of the compositions of the invention. Such carbon blacks are generally characterized by their fine particle size such that their Brunauer, Emmett and Teller (BET-$N_2$) surface areas are generally greater than about 15 $m^2/g$ and will preferably be between about 50 $m^2/g$ and 120 $m^2/g$. Oil furnace carbon blacks are produced by the thermal decomposition and/or partial oxidation of liquid hydrocarbonaceous fuels at temperatures normally in excess of about 2300° F. While the surface chemistry of oil furnace carbon blacks is complex, it is known that such blacks, particularly when aftertreated by partial oxidation, often have bound to their surfaces sulfur and/or oxygen-containing groups such as sulfone, phenol, hydroquinone, carboxylic acid and lactone groups in varying concentrations, said concentrations depending largely upon the composition of the starting material liquid hydrocarbon feedstock, the precise conditions under which the carbon black is produced and the type and extent of aftertreatment, if any, to which the black may be subjected. Said groups are generally recognized as having antioxidant properties, Accordingly, for purposes of the present invention, those oil furnace carbon blacks having such groups on the surface thereof in sufficient concentration to provide the black with a volatile content (ASTM D 1620-60) of at least about 0.5%, by weight of the black, are generally preferred.

The quantity of the oil furnace carbon black to be employed in the compositions of the invention is subject to considerable variation and will depend upon such considerations as the particular carbon black employed, the particular petroleum asphalt to be benefitted, the extent of thermal oxidation or actinic oxidation resistance desired to be imparted to the asphalt composition, the quality of the carbon black dispersion and the like. Substantial improvement in oxidation resistance can, for instance, often be found when the asphalt composition of the invention comprises oil furnace carbon black in an amount of as little as 0.5% by weight of the asphalt or even less. Generally speaking, however, optimum results will ordinarily be achieved at carbon black concentrations of between about 2 and about 5% by weight of the asphalt.

Not included within the scope of this invention are carbon black concentrations which are sufficiently great as to result in substantial physical reinforcement of the petroleum asphalt. A suitable test for determining the extent of reinforcement of asphalt cements by dispersion therein of carbon blacks is disclosed in Report No. FWHA-RD-24, *Modification of Asphalt Cements for Improvement of Wear Resistance of Pavement Surfaces*, F. S. Rostler, R. M. White and P. J. Cass, Federal Highway Administration, March 1972. This report is available from the National Technical Information Service, Springfield, Virginia 22151 under Order No. PB-219 406. In Appendix G of this report, pages 143 through 149, there is described a Pellet Abrasion Test wherein Ottowa sand-containing asphalt samples are prepared, aged if desired, formed into pelleted specimens and the specimens then rolled about in a square bottle rotated on its horizontal axis under controlled temperature conditions. Due to the continuous rolling and repetitive impacting of the specimen under test against the walls of the bottle said specimen physically degrades over a period of revolutions. The loss of weight of the specimen pellet, reported in terms of milligrams per revolution, is representative of its abrasion loss and is an inverse function of the extent of reinforcement thereof by the carbon black. For purposes of the present invention, no substantial physical reinforcement of the asphalt by the oil furnace carbon black is deemed to have occurred when the abrasion loss of an unaged oil furnace carbon black-containing asphalt specimen, tested at room temperature, is greater than about 50 percent of that of a similarly tested control specimen containing no carbon black.

Preparation of the dispersions of the invention should be undertaken in a suitable manner as to assure good distribution of the carbon black particles within the asphalt matrix and direct contact of said carbon black particles with the asphalt. Accordingly, the compositions and methods disclosed in U.S. Pat. No. 4,069,181, cited above, would not be suitable in the practice of the instant invention because, in the Healy et al. patent, the carbon black component is disclosed to be bound to the elastomeric material and cannot, therefore, interact directly with the asphalt upon mixing of the carbon black-containing rubber masterbatch into the asphalt. For those asphalts destined for use in hot asphalt concrete compositions the carbon black can, for instance, be dispersed into the petroleum asphalt at the hot plant during pug mill mixing of the asphalt concrete, the rock or other aggregate forming part of the concrete aiding in the dispersion of the carbon black. If desired, the carbon black can be provided as a mixture thereof with an asphalt-solvating or asphalt-compatible oil, such as, for instance, in the pelleted form disclosed in U.S. Pat. No. 4,094,697, to Rostler. Where the asphalt is to be ultimately solvated with an air-drying solvent, such as mineral spirits, said solvation can be achieved preliminary to the dispersion of the carbon black, thereby rendering the petroleum asphalt into a relatively fluid state prior to incorporation of the carbon black therein. Where preparation of the improved compositions of the invention is contemplated to take place at the asphalt producing plant, suitable dispersion of the carbon black can be achieved while the petroleum asphalt is already heated as a result of a prior processing step. For example, as mentioned hereinbefore, air blowing of petroleum asphalt is generally conducted at temperatures of above about 450° F., whereat the asphalt usually exists in a relatively low viscosity state. The compositions of the present invention, therefore, can be prepared during or subsequent to such air blowing treatment. Thus, the particular dispersion technique employed in the preparation of the compositions of the invention is subject to considerable variation and is normally non-critical provided that the aforementioned good distribution within and direct contact of the carbon black particles with the petroleum asphalt matrix is achieved.

The thermal oxidation and actinic oxidation resistance imparted to the compositions of the invention can be manifested in a number of important and beneficial ways. For instance, the asphalt cements of asphalt concretes prepared from the improved asphalt compositions of the invention do not suffer as great a loss in consistency during hot mixing of the aggregate therein as does a similar petroleum asphalt not containing oil furnace carbon black dispersed therein. This effect is highly suggestive of the fact that thermal oxidation of the asphalt during hot mixing of the concrete is minimized by the presence of the carbon black. Moreover, asphalt concretes comprising the improved petroleum asphalt composition of the invention, when laid in the form of pavements exposed to the sun, are slower to embrittle and crack than are control concretes in which oil furnace carbon black is not present as a dispersion in the petroleum asphalt. Similarly, asphalt shingles manufactured with the improved asphalt compositions of the invention are longer lasting and more resistant to embrittlement and curling than their control counterparts in which the petroleum asphalt does not contain dispersed oil furnace carbon black. Also, solvent-reduced asphalt coating compositions, when exposed as thin films to accelerated ultraviolet weathering in laboratory apparatus under conditions of elevated temperature and continuous water spray, normally signal their oxidative failures by cracking and reductions in thicknesses of the films. When such tests are conducted on coating compositions comprising the improved petroleum asphalt compositions of the invention, the rate at which such oxidative failures occur is substantially reduced and the time of such failures is substantially lengthened relative to similar compositions in which oil furnace carbon black is not present as a dispersed phase in the petroleum asphalt.

Having thus described the invention, it is apparent that many changes, modifications and alterations may be made in the compositions hereinbefore specifically described in reference to particular embodiments thereof. For instance, if desired, the asphalt compositions of the invention may also comprise rubbers, polymers, solvents, oils, mineral fillers, graded and ungraded aggregates, asbestos fiber, surfactants, curing retarders and accelerators, other antioxidants and the like provided, of course, that the presence of such other ingredients does not adversely affect the good dispersion and direct contact relationships between the carbon black particles and the petroleum asphalt matrix in which they are dispersed. Accordingly, although specific preferred embodiments of the invention have been described in detail, above, the description is not intended to limit the invention to these embodiments since they are intended to be construed as illustrative rather than as restrictive or limiting in any way. Thus, the invention is not to be limited to the details disclosed in the foregoing description but may be modified within the scope of the appended claims.

What is claimed is:

1. A composition comprising petroleum asphalt having dispersed therein and in direct contact therewith particles of oil furnace carbon black in an amount effective to substantially improve the resistance of said asphalt to thermal and actinic oxidation and below an amount at which substantial physical reinforcement of said petroleum asphalt occurs.

2. The composition of claim 1 wherein said oil furnace carbon black has a BET-$N_2$ surface area of between 50 and 120 $m^2/g$.

3. The composition of claim 1 wherein said oil furnace carbon black has a volatile content of at least 0.5% by weight.

4. The composition of claim 1 wherein said oil furnace carbon black is present in the amount of between about 2 and about 5 percent by weight of said petroleum asphalt.

5. The composition of claim 1 wherein said petroleum asphalt is a blown asphalt.

* * * * *